United States Patent [19]

Iwaki et al.

[11] Patent Number: 4,564,799
[45] Date of Patent: Jan. 14, 1986

[54] TWO-BATTERY POWER SUPPLY SYSTEM FOR VEHICLES

[75] Inventors: Yoshiyuki Iwaki, Himeji; Akio Matsumoto; Mitsuyoshi Yokota, both of Hyogo, all of Japan

[73] Assignee: Mitsubishi Denki Kabushiki Kaisha, Japan

[21] Appl. No.: 495,585

[22] Filed: May 18, 1983

[30] Foreign Application Priority Data

May 25, 1982 [JP] Japan ................... 57-90132
May 25, 1982 [JP] Japan ................... 57-90133
May 25, 1982 [JP] Japan ................... 57-90134

[51] Int. Cl.$^4$ ........................ H02J 7/00; H02J 7/14
[52] U.S. Cl. ........................... 320/6; 320/15; 320/61; 322/2 R; 307/84
[58] Field of Search .................... 320/2-4, 320/6, 7, 12, 15, 16, 17, 61; 322/1, 2, 86, 88; 307/84

[56] References Cited

U.S. PATENT DOCUMENTS

| | | | |
|---|---|---|---|
| 1,118,269 | 11/1914 | Creveling | 320/61 X |
| 1,288,938 | 12/1918 | Leonard | 320/6 |
| 2,044,917 | 6/1936 | Richardson | 320/6 X |
| 3,444,946 | 5/1969 | Waterbury | 320/61 U X |
| 4,207,511 | 6/1980 | Radtke | 320/6 |
| 4,210,856 | 7/1980 | Taylor . | |
| 4,277,737 | 7/1981 | Muller-Werth | 320/2 |
| 4,321,522 | 3/1982 | Matsunaga | 320/2 |

*Primary Examiner*—R. J. Hickey
*Attorney, Agent, or Firm*—Leydig, Voit & Mayer Ltd.

[57] ABSTRACT

The present invention relates to a power supply system for vehicles having a generator which includes an armature coil for generating three-phase alternating current, a field coil held in opposition to the armature coil, a rectifier for converting an A.C. output of the armature coil into a direct current, and a voltage regulator for setting the generated voltage of the armature coil at a constant value by controlling a current flowing through the field coil, and a first battery which is connected across output terminals of the generator; a starting motor and an electric load connected in parallel with the first battery; and consists of a two-battery power supply system for vehicles comprising a second battery which is connected to an ignition device separately from said first battery, and which is charged by a power source other than said generator.

5 Claims, 3 Drawing Figures

TWO-BATTERY POWER SUPPLY SYSTEM FOR VEHICLES

BACKGROUND OF THE INVENTION

This invention relates to a two-battery power supply system for vehicles.

A prior-art power supply system for vehicles has been as shown in FIG. 1. In the figure, numeral 1 designates an armature coil for generating three phase alternating current, numeral 2 a field coil which is disposed in opposition to the armature coil 1, numeral 3 a rectifier which converts the A.C. output of the armature coil 1 into a direct current, numeral 4 a voltage regulator which regulates the voltage generated by the armature coil 1 to be constant by controlling the current flowing through the field coil 2, numeral 5 a key switch, numeral 6 a battery, numeral 7 a starting motor, numeral 8 an electric load, numeral 9 an ignitor, and numeral 10 an ignition coil.

The operation of the power supply system having the above arrangement will be described herebelow:

When the key switch 5 is closed, current flows through the primary side of the ignition coil 10. Subsequently, an engine, not shown, is rotated by the starting motor 7. Then, the ignitor 9 operates to generate a high voltage on the secondary side of the ignition coil 10. The high voltage is supplied to ignition plugs, not shown, and a mixture in cylinders, not shown, ignites to start the engine. In addition, when the engine starts, the armature coil 1 produces the A.C. output, which is converted into the direct current by the rectifier 3. With the terminal voltage held constant by controlling the current of the field coil 2 by means of the voltage regulator 4, electric power is supplied to the battery 6 as well as the electric load 8 and the ignitor 9 as well as the ignition coil 10.

Since the prior-art system is constructed as described above, the terminal voltage of the battery lowers during the starting of the engine (particularly during cold periods) due to a large current flowing through the starting motor. This leads to the disadvantage that the design of the ignitor and ignition coil inevitably becomes complicated in order to operate the system in spite of great voltage fluctuations (for example, 6 V to 16 V). Further, since the circuit comprises a single battery, the system must be designed so as to withstand surge voltages, etc., at the interruption of the electrical load.

SUMMARY OF THE INVENTION

This invention has been made in order to eliminate the disadvantages of the prior art as mentioned above, and has for its object to provide for an ignition device a stable power source which involves small voltage fulctuations and which is hardly affected by surge voltages or noise, by disposing a second battery for the ignition device and charging the second battery by means of a power source other than a generator.

BRIEF DESCRIPTION OF THE DRAWINGS

In the drawings, the same symbols indicate the same or corresponding parts.

DESCRIPTION OF THE PREFERRED EMBODIMENTS

Figure 1:
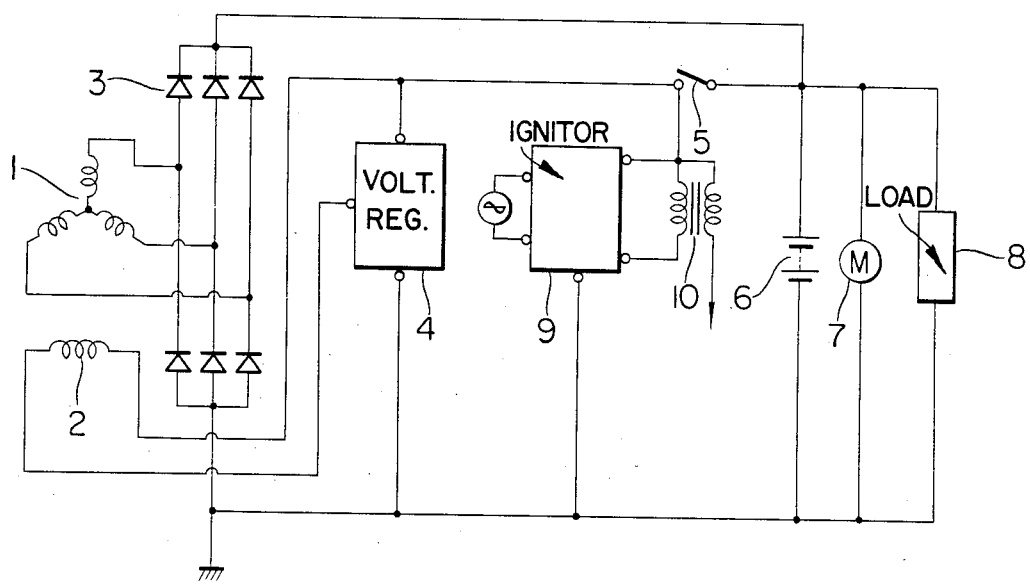
FIG. 1 is a circuit diagram of a prior-art power supply system.

An embodiment of this inventon will now be described with reference to FIG. 2. The same or corresponding parts as or to those in FIG. 1 are denoted by the same symbols, and their details will now be repeatedly described.

Figure 2:
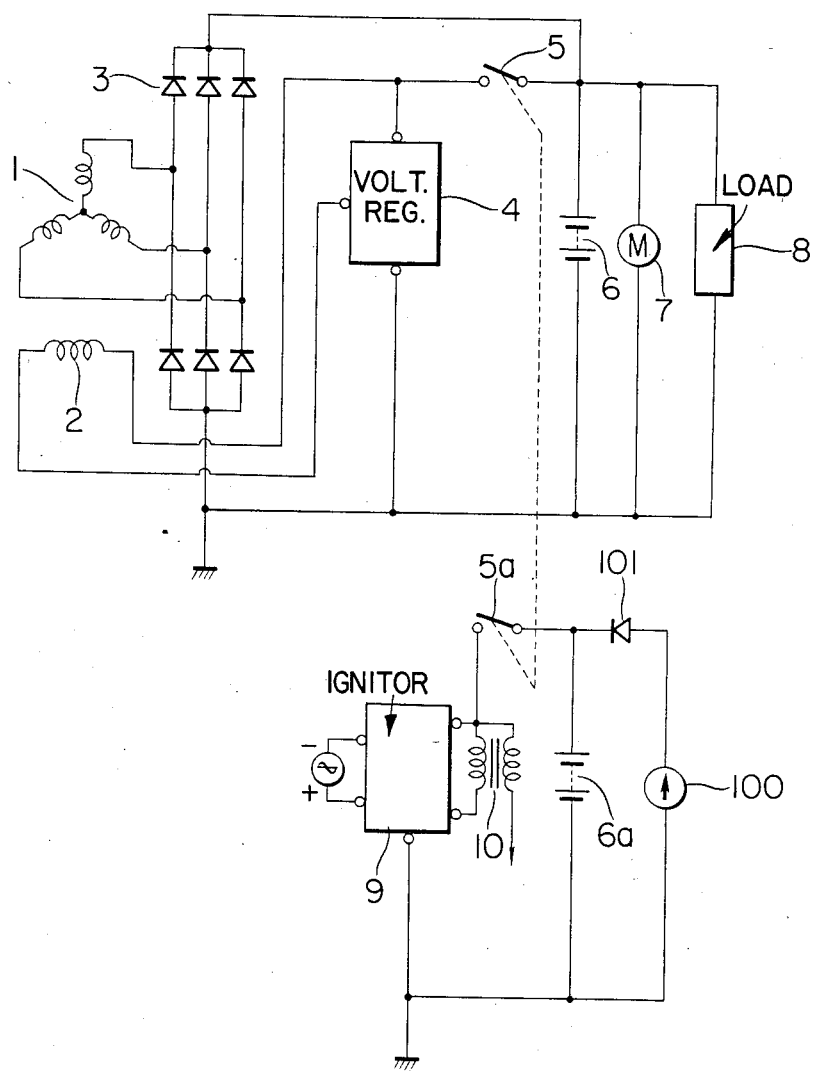
FIG. 2 is a circuit diagram showing a two-battery power supply system embodying this invention.

Referring to FIG. 2, as a power source for an ignition coil 10, a second battery 6a is disposed separately from a first battery 6. A second key switch 5a interlocking with a first key switch 5 is connected in series in a circuit which connects the second battery 6a and the ignition coil 10. Further, a power source 100 for charging the second battery 6a is arranged in parallel therewith. Shown at numeral 101 is a diode for blocking a reverse current through the battery 6a.

The operation of this invention having the above arrangement will now be described.

When the first and second key switches 5 and 5a are closed, current flows through a field coil 2, and also current flows through the primary side of the ignition coil 10. Subsequently, when an engine, not shown, is rotated by a starting motor 7, an ignitor 9 operates to produce a high voltage on the secondary side of the ignition coil 10. The high voltage is distributed to ignition plugs, not shown, and a mixture in cylinders, not shown, ignites to start the engine. The second battery 6a is charged via the reverse current checking diode 101 by means of the power source 100 which is, for example, a solar cell. While the engine continues to rotate, an armature coil 1 produces an A.C. output, which is converted into a direct current by a rectifier 3. With the terminal voltage held constant by controlling the current of the field coil 2 by means of a voltage regulator 4, electric power is fed to the first battery 6 and an electric load 8.

In the above embodiment, the solar cell has been exemplified as the power source of the second battery 6a. However, the second battery 6a can be charged by the use of a thermoelectric transducer or a thermionic generator which can convert the heat of the exhaust gasses from the engine or cooling water of a vehicle directly into a electric energy. The battery 6a can also be charged by a piezoelectric transducer which can convert the vibrations of the engine directly into electric energy.

As set forth above, according to this invention, the two-battery power supply system is constructed by disposing a second battery for the ignition device namely, the ignition coil and ignitor. Thus, the following excellent effects are attained:

Owing to the fact that the power source of the ignition device has a battery connected in series therewith for exclusive use thereof which is electrically separate from a battery connected with the starting motor of the vehicle and any other electric loads, the voltage across the ignition device is held constant which allows for easy starting of the engines, (1) since the voltage drop during the starting of the vehicles' engine has no influence on the voltage supplied to the ignition device, the starting performance of the engine is enhanced, (2) since the operating voltage margin of the ignitor as well as the ignition coil diminishes (for example, a margin of 6–16 V becomes 12–16 V), the design thereof is simplified, and (3) the surge voltages of the electric load, the generator etc., and noise diminish, and the operation of the ingnitor (of the electronic type) is stabilized.

Figure 3:
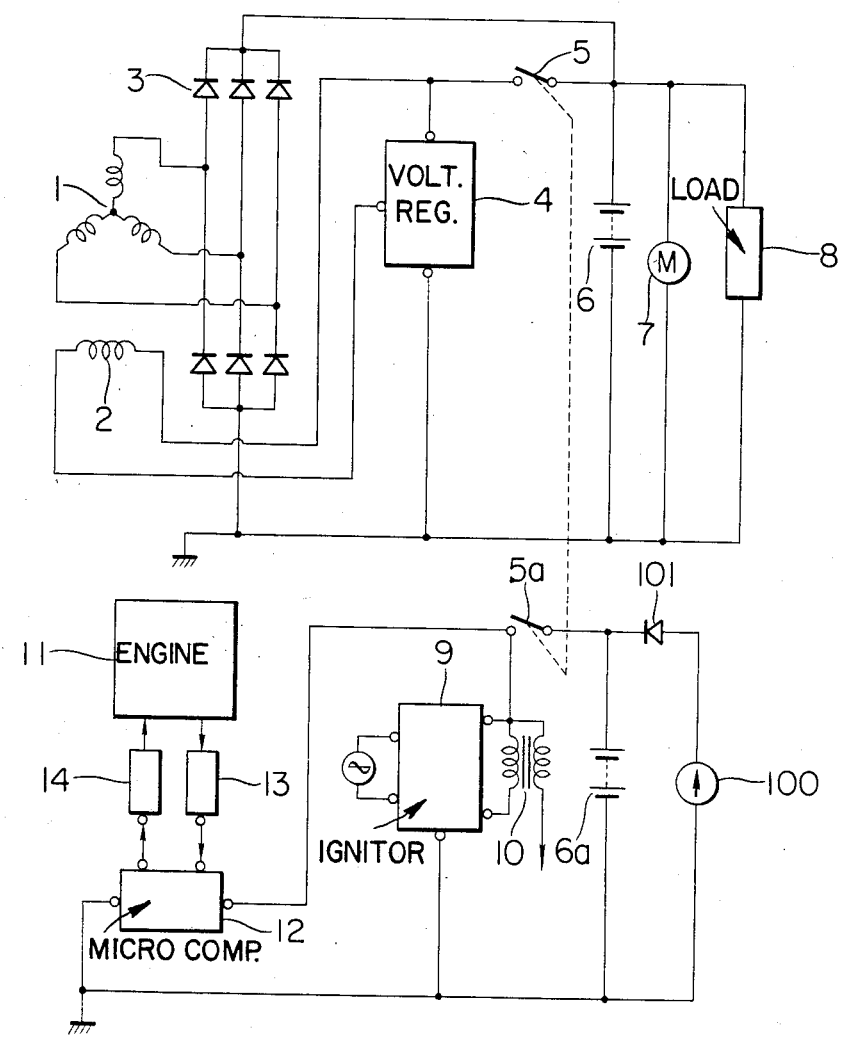
FIG. 3 is a circuit diagram showing another embodiment of this invention.

As stated here above, according to this invention, the power supply system can be arranged so as not to be affected by voltage fluctuations during the starting operation. Therefore, the electric circuit of the second battery can be provided with electric equipment which requires only a stable supply voltage. FIG. 3 shows another embodiment, in which the same or corresponding parts as or to those in FIG. 2 are assigned the same symbols. A microcomputer 12 for controlling an engine 11 is connected to a second battery 6a, along with an ignitor 9 and an ignition coil 10. Owing to this arrangement, when first and second key switches 5 and 5a are closed to start the engine 11, as explained with reference to FIG. 2, various data of the engine are inputted to the microcomputer 12 by sensors 13. Further, responsive outputs from the microcomputer 12 operate actuators 14 so as to control the engine 11. It is to be understood that also this embodiment achieves the effects explained as to the embodiment of FIG. 2. The present invention is applicable to equipment which requires stable supply voltages without the influence of votage fluctuations due to the starting motor of a vehicle.

What is claimed is:

1. In a two-battery power supply system for vehicles having a generator including an armature coil for generating three-phase alternating current, a field coil associated with the armature coil, a rectifier for converting an A. C. output of the armature coil into a direct current, and a voltage regulator for setting the generated voltage of the armature coil at a constant value by controlling a current flowing through the field coil, a first battery connected across output terminals of the generator, a starting motor and an electric load connected in parallel with the first battery, and an ignition device, the improvement comprising: a second battery connected to said ignition device and providing a power source to said ignition device isolated from said first battery, and means including a power source other than said generator for charging said second battery to provide a stable voltage to said ignition device independent of the voltage of said first battery.

2. A two-battery power supply system for vehicles according to claim 1 wherein said power source comprises a solar cell for converting solar radiation directly into electric energy.

3. A two-battery power supply system for vehicles according to claim 1 wherein said power source comprises a thermoelectric transducer for converting heat of exhaust gas or cooling water of the vehicle directly into electric energy.

4. A two-battery power supply system for vehicles according to claim 1 wherein said power source comprises a piezoelectric transducer for converting vibrations of an engine of the vehicle directly into electric energy.

5. In a two-battery power supply system for vehicles having a generator which includes an armature coil for generating three-phase alternating current, a field coil associated with the armature coil, a rectifier for converting an A. C. output of the armature coil into a direct current, a voltage regulator for setting the generated voltage of the armature coil at a constant value by controlling a current flowing through the field coil, a first battery connected across output terminals of the generator, a starting motor, and an electric load connected in parallel with the first battery, an ignition device and a vehicle controlling microcomputer connected thereto; the improvement comprising a second battery connected to said vehicle controlling microcomputer and said ignition device providing a power source therefor isolated from said first battery and supplying a stable supply voltage thereto, and means including a power source other than said generator for charging said second battery to provide a supply voltage independent of the voltage of said first battery.

* * * * *